3,239,427
PRODUCTION OF 6-AMINOPENICILLANIC ACID
Hsing T. Huang, Groton, Conn., and Arthur R. English,
Ho-Ho-Kus, N.J., assignors to Chas. Pfizer & Co., Inc.,
New York, N.Y., a corporation of Delaware
No Drawing. Filed Oct. 12, 1959, Ser. No. 845,609
7 Claims. (Cl. 195—36)

This invention is concerned with the production of 6-aminopenicillanic acid by microbiological means. In particular, it is concerned with the hydrolysis of penicillins by means of bacteria or hydrolyzing enzymes produced by these bacteria to produce 6-aminopenicillanic acid.

This application is a continuation-in-part of our earlier filed copending United States Patent application Serial Number 821,679; filed June 22, 1959 and now abandoned.

It is known to produce 6-aminopenicillanic acid, the valuable intermediate which may be regarded as the parent compound of the various penicillins which differ only in the acyl substituent on its 6-amino group, by synthesis (Sheehan A.C.S. Mtg., Boston, April, 1959), and by fermentation of a penicillin producing mold in a suitable nutrient medium particularly in the absence of a side chain precursor. The production of 6-aminopenicillanic acid in this manner points to its formation as an intermediate in the microbiological synthesis of penicillins, as an alternative metabolite or as a product of enzymatic hydrolysis of a penicillin.

Previous evidence for the enzymatic hydrolysis of a penicillin was cited by Sakaguchi, et al., J. Agr. Chem. Soc., Japan, 23,411 (1950) who claim to have found a new enzyme, which they termed penicillin-amidase, in the mycelium of *Penicillium chrysogenum* Q 176 which cleaves N-benzyl-penicillin (penicillin G) into 6-aminopenicillanic acid and phenylacetic acid.

It has now been found possible to hydrolyze penicillins with the hydrolyzing activity of microorganisms of the class of Schizomycetes to produce 6-aminopenicillanic acid. This hydrolyzing activity is referred to here as "penicillinacylase" activity since it results in elimination of an acyl moiety from a penicillin. The 6-aminopenicillanic acid produced is highly valuable as an intermediate for the synthesis of new and heretofore unavailable penicillins and penicillins difficult or costly to obtain by presently known methods.

By the term "a penicillin" is meant the natural and synthetic, both chemically and biochemically produced, penicillins having the formula:

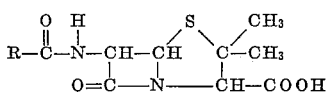

wherein R is selected from the group consisting of saturated and unsaturated alkyl, aryl, aralkyl, heterocyclic, alicyclic and substituted derivatives thereof. Representative penicillins illustrative of those corresponding to the above formula are listed below. For convenience, only the R group is listed:

p-allylmercaptobenzyl
allylmercaptomethyl
p-allyloxybenzyl
allyloxymethyl
o-aminobenzyl
p-aminobenzyl
(d-4-amino-4-carboxy-n-butyl)
benzylmercaptomethyl
o-bromobenzyl
p-bromobenzyl
3-bromo-3-buten-1-yl
p-chlorobenzylmercaptomethyl
5-bromo-2-thenyl
benzyl
6-bromo-2-naphthylmethyl
2-butenyl
n-butoxymethyl
n-butyl
t-butylmercaptomethyl
p-carbethoxyhydroxybenzyl
3-chlorocyclopentylmethyl
phenylthiomethyl
phenoxymethyl
n-heptyl
cyclohexyl
2-cyclopentenylmethyl
2,4-dichlorobenzyl
p-(β,α-dihydroxypropoxy)benzyl
3,4-dimethylbenzyl
3-(p-bromophenylazo)-4-hydroxybenzyl
α-thienyl
p-chlorophenyl
p-methoxybenzyl
o-fluorobenzyl
m-hydroxybenzyl
4-heptylmercaptomethyl
p-iodobenzyl
p-nitrobenzyl
2-thienylmercaptomethyl
m-tolylmethyl Moreover, the penicillins can also be used in the form of their salts; that is as their basic salts, for example, sodium, amine, and potassium salts. In general it is preferred to use the alkali metal salts, especially the potassium and sodium salts of the penicillins since they are more readily available and generally more stable than the acid salts.

A wide variety of bacteria and several species of Nocardia have been found to be penicillin-acylase producers. The strains of microorganisms are selected by testing their ability to hydrolyze benzylpenicillin. Although any penicillin can be used as substrate in the test procedure, the benzylpenicillin sodium or potassium salts are specifically mentioned because of their ready availability. Its utilization as substrate in this process is based only on economic reasons and if, in the future some other penicillin or penicillins become as readily or more readily available as a result of constant developments in the field, they would undoubtedly serve to displace benzylpenicillin from its preferred position.

Preliminary testing of the microorganisms for penicillin-acylase activity can be carried out by a number of methods to determine whether or not penicillin-acylase activity is present and the approximate relative value of this activity. Since 6-aminopenicillanic acid possesses a much lower order of antibacterial activity than does benzylpenicillin, microbiological assay of the fermentation liquor to determine a decrease in potency is indicative of penicillin-acylase activity. However, since other factors may operate to destroy benzylpenicillin activity, this test is not conclusive. In another modification, which is satisfactory as a screening test, the 6-aminopenicillanic acid on paper chromatograms is detected by conversion to benzylpenicillin followed by plating on agar seeded with *Bacillus subtilis*. The preferred test method involves removal of the benzylpenicillin by solvent extraction, at low pH, of the fermentation liquor followed by treatment of the liquor with phenylacetyl chloride in the presence of a weak base, and microbiological assay, or paper chromatographic identification of the resulting benzylpenicillin. Other acylating agents can, of course, be utilized to convert the 6-aminopenicillanic acid to an active penicillin which is detected by paper chromatography.

More specifically, the preferred test method for selecting a penicillin-acylase producing strain of microorganism comprises diluting a culture of the microorganism under investigation followed by plating out on a suitable solid nutrient medium and incubation to produce a considerable number of single cell colonies. Individual colonies are then transferred to slants. Each isolate is grown in a suitable medium under submerged conditions in shake flasks. When good growth is obtained, the pH of the culture is adjusted to 7.0 to 8.0, if necessary. Benzylpenicillin (potassium or sodium salt) at a level of 2 to 5 mg./ml. is added and the mixture is shaken in the presence of 1% toluene from 2–20 hours. The cells are then removed, the clarified broth acidified to a pH value of from about 1 to about 3 with a mineral acid, such as, sulfuric acid, and then extracted with a water immiscible organic solvent to remove benzylpenicillin. Any water immiscible organic solvent is suitable as extracting solvent. However, several water immiscible organic solvents are better than others for reasons of economics and higher solubility of the benzylpenicillin therein. Among these are methyl isobutyl ketone, butyl acetate, diethylether, butanol and chloroform. The extracted broth is then adjusted to about 7 to 9, buffered at this level with, for example, sodium bicarbonate or disodium hydrogen phosphate, and then treated with an excess of an acylating agent, preferably phenylacetyl chloride for periods of from about 10 minutes to about 2 hours at a temperature of from about 0° C. to about 50° C. The benzylpenicillin thus produced is then identified and assayed in accordance with standard practice. The assay value obtained provides a relative measure of the penicillin-acylase producing capacity of a given organism in terms of benzylpenicillin units.

Still another assay for pencillin-acylase activity consists in incubating a sample of the conversion mixture with excess penicillinase for about 15 minutes at 28° C. and then running a paper chromatogram in the system methyl ethyl ketone: acetic acid. Development of the paper chromatogram with ninhydrin gives an intense blue-violet spot due to penicic acid produced by the action of penicillinase on the 6-aminopenicillanic acid.

The microorganisms which include these penicillin-acylase producing strains are those belonging to the Schizomycetes, particularly certain strains of species of the genus Alcaligenes, the genus Proteus, the genus Aerobacter, the genus Escherichia, the genus Pseudomonas, the genus Xanthomonas, the genus Erwinia, the genus Serratia, the genus Bordetella, the genus Micrococcus, the genus Sarcina, the genus Corynebacterium, the genus Flavobacterium, the genus Cellulomonas, the genus Micromonospora, the genus Nocardia.

The preferred strains of microorganisms are selected from the following species, namely: *Pseudomonas phaseolicola, Pseudomonas asplenii, Pseudomonas aureofaciens, Pseudomonas chlororaphis, Pseudomonas fluoroscens, Pseudomonas aeruginosa, Pseudomonas cichorii, Pseudomonas solaniolens, Pseudomonas syringae, Pseudomonas viridiflava, Pseudomonas striata, Pseudomonas angulata, Xanthomonas uredovorus, Alcaligenes faecalis, Escherichia coli, Areobacter aerogenes, Erwinia amylovora, Proteus rettgeri, Proteus sphingidis, Serratia morcescens, Bordetella pertussis, Sarcina lutea, Corynebacterium fascians, Corynebacterium tumescens, Flavobacterium suaveolens, Micrococcus lysodeikticus, Micrococcus candidans, Micrococcus roseus, Cellulomonas rossica, Micromonospora fusca,* and *Nocardia sp.,* strain L.A.V.

For any given species of microorganism, it is necessary to select strains which produce penicillin-acylase activity. This invention is not limited to any species of microorganism nor does it include every strain of any given species. On the other hand every strain of microorganism yet tried, which produces penicillin-acylase, has been found capable of producing adequate conversion rate of penicillin substrates and satisfactory yields of 6-aminopenicillanic acid.

The organisms operative in this invention include both gram-positive and gram-negative types. On the basis of available data, the gram-negative type appear to be more efficient penicillin-acylase producers in general than are the gram-positive type.

The choice of culture medium is not a critical factor. Indeed, any of the media commonly used for growing microorganisms of the type given above can be employed. However, it should be pointed out that a medium containing naturally occurring materials is preferred over a purely synthetic media because of better growth and rate of penicillin-acylase production. Certain media, of course, are better suited for a particular microorganism than are others for reasons of faster growth and increased rate of penicillin-acylase production. This is determinable by experiment and is illustrated in the examples which follow. It is to be understood that the present invention embraces the use not only of the above described organisms, which are given merely for illustrative purposes; but it also embraces the use of mutants produced from the described organisms by means such as X-ray irradiation, ultra-violet irradiation, treatment with nitrogen mustards and the like. It is to be further understood that the invention includes the use of subcultures obtained by various standard microbiological techniques, such as the single colony and single spore isolation methods. Such mutants and/or subcultures may differ in certain respects from the above described new strains.

The effectiveness of the penicillin-acylase producing microorganisms for the process of this invention may be determined by cultivating the organism in a suitable nutrient medium containing a carbohydrate source such as sugars, starch and glycerol, an organic nitrogen source such as soy bean meal, cotton seed meal, peanut meal, hydrolyzed casein and cornsteep liquor, and mineral salts such as sodium chloride, sodium nitrate, magnesium sulfate and potassium phosphate. In addition to these, a buffering agent, such as calcium carbonate or potassium dihydrogen phosphate, and a foam preventor such as vegetable oils or animal oils may be used. The organism is best grown under submerged conditions of agitation and aeration at temperatures ranging from about 20° C. to about 40° C., but preferably from about 26° C. to about 30° C. The preferred pH range for the growth of the culture is from 6 to 8. During the growth phase, the medium is agitated with stirrers of suitable design for incorporating air into the broth. Aeration at a rate of from about ½ to 2 volumes of air per volume per minute produces satisfactory results. The penicillin compound as a solid, that is, as the amphoteric form or preferably as the sodium or potassium salt, or as a solution in a suitable solvent, for example, water, acetone and lower alkanols such as ethanol, and aqueous mixtures thereof, may be added to the cultivated bacteria under sterile conditions and the mixture agitated and aerated in order to bring about hydrolysis of the penicillin substrate. The penicillin may be added when the medium is seeded under sterile conditions with a culture of the microorganism or after growth of the organism is established.

In most cases it has been found advisable to add the penicillin compound after growth of the microorganism has been established in the nutrient medium under aerobic conditions. This is particularly true, if during the initial stages of growth of the microorganism, there is a tendency to produce undesired by-products from the penicillin substrate. Best results are obtained when, after growth of the organism is established and subtrate added, the conversion mixture is maintained at pH 7.0 to 8.0 and gently agitated. Alternatively, enzyme preparations from the growth of the organism may be used for conducting the process. A further, most useful method is one in which the microorganism is grown on a suitable nutrient medium under aerobic conditions in the absence of the penicillin. The cells are then collected by centrifugation or by filtration in the presence of a suitable precipitating agent and may, if desired, be washed with distilled water. The cells are then suspended in distilled water containing the penicillin substrate. The mixture is agitated and maintained at about pH 7 to 8 for a period of from about 12 to 48 hours after which the products of the reaction are recovered. This process has the advantage of ease of recovery of the penicillin compound, since the various nutrient material originally used to obtain growth of the microorganism is now absent as well as the various material excreted by the growth organism during the initial period. In some cases even better yields are obtained by this method than in the case when the penicillin is added at the beginning or at an intermediate period directly to the whole fermentation broth. Other methods familiar to enzyme chemists may be utilized for conducting the present hydrolysis process. The proportion of products and the rate of hydrolysis as well as the nature of the by-products formed, may vary depending on the use of the whole fermentation broth or of the isolated cells. In addition, the medium remaining after renewal of the cells is, in some cases, also capable of hydrolyzing penicillins.

In general, a concentration of not greater than one-tenth to five percent of substrate by volume based on the total volume of culture is used in conducing this process, although sometimes other concentrations may be found to be more favorably used.

The 6-aminopenicillanic acid can be isolated from the conversion mixtures by various methods. It should be pointed out that the fermentation broths can be used in the diulte form as produced, or in concentrated form. The 6-aminopenicillanic acid can be isolated by ion-exchange technique using a strong sulfonic acid type resin, such as Dowex–50, Amberlite IR–120; or a strong quaternary type anion exchange resin, such as Dowex–1, Dowex–2, Amberlite IRA–400, Deacidite–FF. Alternatively, it may be acylated with carbobenzoxy chloride, the resulting benzyloxypenicillin extracted with a water immiscible organic solvent and then catalytically reduced to regenerate 6-aminopenicillanic acid as described by Huang in copending patent application Serial Number 803,377, filed April 1, 1959.

The 6-aminopenicillanic acid can be acylated directly to the desired penicillin without isolation per se by treatment of the conversion mixture in diluted or concentrated form, with the appropriate acylating agent as described above. The penicillin thus produced is isolated by known methods, for example, by extraction into a non-aqueous solvent or by column chromatography.

In the specific examples presented below, emphasis has been placed on the utilization of benzylpenicillin as substrate for the formation of 6-aminopenicillanic acid because of its availability and cost. However, as mentioned above any penicillin can serve as substrate. The choice of the particular penicillin is determined primarily by economic factors. Thus, it is to be understood that the following examples are given solely for purposes of illustration and not of limitation.

*Example I*

An aqueous medium having the following composition was prepared:

| Ingredients: | Grams/liter |
| --- | --- |
| Dipotassium phosphate | 7.0 |
| Potassium dihydrogen phosphate | 3.0 |
| Sodium citrate | 0.4 |
| Magnesium sulfate heptahydrate | 0.1 |
| Ammonium sulfate | 0.1 |
| NZ amine (casein hydrolyzate) | 5.0 |
| Yeast extract | 0.5 |
| Glucose | 2.0 |

Adjust to pH 7.0.
Tap water to volume.

100 ml. of this nutrient medium in a 250 ml. flask sterilized in the usual way, was inoculated with a slant culture of *Proteus rettgeri* ATCC 9918, and then shaken for 24 hours at 28° C. until good growth was obtained. The pH was then adjusted to 7.0–7.8 with dilute sodium hydroxide, 100 mg. of benzylpenicillin potassium salt, dissolved in pH 7.8 phosphate buffer, and 2 ml. of toluene added and the reaction mixture incubated for 24 hours at 28° C. with shaking. The mixture was periodically assayed for 6-aminopenicillanic acid by paper chromatography using the system toluene:acetone:calcium acetate, 2% aqueous solution (2:9:1). The benzylpenicillin substrate moves with an $R_f$ value of 0.3 while the 6-aminopenicillanic acid remains at the origin. Spraying of the 6-aminopenicillanic acid spot with 1% sodium bicarbonate followed by 0.2% phenylacetyl chloride in acetone yields benzylpenicillin. The benzypenicillin thus prepared produces a characteristic zone of inhibition at the origin when the paper chromatogram is bioautographed on an agar plate seeded with *B. subtilis*.

Quantitative determination of the 6-aminopenicillanic acid present was accomplished by conversion to benzylpenicillin and determination of the benzylpenicillin potency by the standard procedure. The broth was filtered, adjusted to pH 2.5–3.0 with dilute hydrochloric acid and extracted with an equal volume of methyl isobutyl ketone (MIK) to remove unconverted benzylpenicillin. The aqueous 6-aminopenicillanic containing phase was raised to pH 7.5 with dilute sodium hydroxide and, to a 10 ml. aliquot, 0.2 g. sodium bicarbonate and 0.2 ml. of phenylacetyl chloride added. After 50 minutes at room temperature with continuous agitation the pH was adjusted to 6.5 and bioassayed for benzylpenicillin. Pertinent assay data, expressed in units of benzylpenicillin ($\mu$/ml.), are given below. 1 unit of benzylpenicillin (sodium salt) equals 0.658 unit of 6-aminopenicillanic acid (6-aminopenicillanic acid):

| | |
| --- | --- |
| Initial | 1660 |
| After 24 hours | 240 |
| After MIK extraction | 30 |
| After acylation | 765 |
| 6-aminopenicillanic acid | 503 |

The 6-aminopenicillanic acid was isolated from the remaining reaction mixture, following filtration and methyl isobutyl ketone extraction of unconverted benzylpenicillin at pH 2.2, by concentration to small volume and precipitation at pH 4.2. The addition of acetone to the concentrate facilitated precipitation.

*Example II*

The procedure of Example I was repeated using the following medium:

| Ingredient: | Grams/liter |
| --- | --- |
| Difco nutrient broth | 4.0 |
| Yeast extract | 5.0 |
| Liver "S" | 1.0 |
| Glucose | 2.0 |

Adjust to pH 7.0.
Tap water to volume.

The following assay data were obtained (expressed in benzylpenicillin units, $\mu$/ml.):

| | |
| --- | --- |
| Initial | 1660 |
| After 24 hours | 720 |
| After MIK extraction | 30 |
| After acylation | 450 |
| 6-aminopenicillanic acid | 296 |

The 6-aminopenicillanic acid was recovered by ion-exchange with Amberlite IR–120 and elution with ammonia.

*Example III*

Following the procedure of Example I, 6-aminopenicillanic acid was prepared by replacement of *Proteus rettgeri* ATCC 9918, by the following organisms: *Escherichia coli* ATCC 9637, *Aerobacter aerogenes* ATCC 13529, *Alcaligenes faecalis* ATCC 212, *Pseudomonas phaseolicola* ATCC 13534, *Bordetella pertussis* ATCC 13600, *Pseudomonas aeruginosa* NRRL 1014 J, *Pseudomonas aureofaciens* NRRL B1482R, *Corynebacterium fascians* Burkholder No. 19, *Proteus sphingidis* ATCC 6911, *Proteus rettgeri* ATCC 9250, *Proteus rettgeri* ATCC 9919, *Nocardia sp.*, Strain L.A.V. ATCC 13635 and *Micromonospora fusca* ATCC 13634.

Example IV

A sterile aqueous medium having the following compositions was prepared:

| Ingredient: | Grams/liter |
|---|---|
| Disodium phosphate | 7.15 |
| Dipotassium phosphate | 2.0 |
| Diammonium phosphate | 3.0 |
| Ammonium sulfate | 1.5 |
| Magnesium sulfate heptahydrate | 0.2 |
| Calcium chloride | 0.001 |
| Yeast extract | 0.5 |
| NZ amine (enzymatic hydrolyzate of casein) | 5.0 |
| Cerelose (dextrose hydrate) | 5.0 |

Adjust to pH 7.5.
Tap water to volume.

Inoculum was prepared by transferring a well grown slant of *Proteus asplenii* NRRL B733 to 500 ml. of this medium in a Fernbach flask and incubating for about 24 hours at 28° C. Two liters of medium was then inoculated by mixing with 5% by volume of the inoculum thus prepared. Aeration was effected at a rate of about 1 volume of air per volume of broth per minute and efficient agitation was provided during incubation at 28° C. After about 24 hours, 5 g. per liter of benzylpenicillin potassium salt and 20 ml. of toluene were added, the mixture adjusted to pH 7.5, stirred for 15 minutes then allowed to stand with occasional stirring.

Progress of the conversion was followed as described in Example I. After about 48 hours, the broth was worked up according to the procedure of Example I to give 6-aminopenicillanic acid.

In like manner, the following penicillins are converted to 6-aminopenicillanic acid (used as their potassium salts unless otherwise indicated):

Phenoxymethyl penicillin
Allylmercaptomethyl penicillin
(D-4-amino-4-carboxy-n-butyl)penicillin
n-Heptyl penicillin sodium salt
Cyclohexyl penicillin sodium salt
2,4-dichlorobenzylpenicillin
Phenylthiomethyl penicillin
5-bromo-2-thenylpenicillin
3,4-dimethylbenzylpenicillin
Methylmercaptomethylpenicillin
p-Aminobenzylpenicillin
n-Butoxymethylpenicillin
p-Nitrobenzylpenicillin
p-Hydroxybenzylpenicillin
3-(p-bromophenylazo)-4-hydroxybenzylpenicillin
Benzylpenicillin sodium salt

Example V

The procedure of Example III was repeated but using the following medium:

| Ingredient: | Gram/liter |
|---|---|
| Dipotassium phosphate | 7.0 |
| Potassium dihydrogen phosphate | 3.0 |
| Sodium citrate | 0.4 |
| Magnesium sulfate heptahydrate | 0.1 |
| Ammonium sulfate | 0.1 |
| Yeast extract | 0.5 |
| Cerelose (dextrose hydrate) | 10.0 |
| NZ amine (enzymatic hydrolyzate of casein) | 5.0 |

Tap water to volume.

Each of the several organisms tested produced 6-aminopenicillanic acid.

Example VI

A sterile aqueous medium having the following composition was prepared:

| Ingredient: | Grams/liter |
|---|---|
| Corn steep liquor | 20.0 |
| Crude molasses B | 20.0 |
| Crude glycerol | 10.0 |
| Diammonium phosphate | 10.0 |
| Magnesium sulfate heptahydrate | 1.0 |

Adjust to ph 7.5 with dilute potassium hydroxide.
Tap water to volume.

A slant culture of *Proteus rettgeri* ATTC 9919 was transferred to 1000 ml. of this medium in a Fernbach flask and shaken at 28° C. until good growth was obtained, about 24 hours.

A 4 l. fermenter was charged with 2 l. of medium having the above composition then inoculated with 100 ml. of inoculum thus prepared. The temperature was maintained at 28° C. and the broth stirred at 1700 r.p.m. and aerated at the rate of 5 volumes of air per volume of broth per minute. After 24 hours, 10 g./l. of the potassium salt of benzylpenicillin and 20 ml. of toluene were added. The pH was adjusted to 7.5 and the mixture stirred for 15 minutes then allowed to stand at room temperature with occasional stirring (about once every half hour).

The broth was assayed and worked up as described in Example I.

Example VII

Repetition of the procedure of Example II but using centrifuged cells of *Proteus rettgeri* ATCC 9919 in place of freeze dried cells gave the same results.

Example VIII

Following the procedure of Example I the following penicillins are converted to 6-aminopenicillanic acid which is detected by conversion to benzylpenicillin on paper chromatograms. Isolation is not carried out in this primarily screening procedure.

p-Allylmercaptobenzylpenicillin
p-Allyloxybenzylpenicillin
2-butenylpenicillin
6-bromo-2-naphthylmethylpenicillin
2-cyclopentylmethylpenicillin
p-Methoxybenzylpenicillin
o-Fluorobenzylpenicillin
2-thienylmercaptomethylpenicillin
p-Chlorophenylpenicillin
α-thienylpenicillin
p-Methylphenylpenicillin
α-furylpenicillin

Example IX

Following the procedure of Example VIII, but using the medium of Example II, 6-aminopenicillanic acid was obtained by substituting *Proteus rettgeri* by cultures of the following organisms:

*Pseudomonas asplenii* NRRL B733
*Pseudomonas chlororaphis* NRRL B560
*Pseudomonas fluorescens* NRRL B10
*Xanthomonas uredovorous* ATCC 13531
*Erwinia amylovora* ATCC 13530
*Proteus sphingidis* ATCC 6911
*Alcaligenes faecalis* ATCC 212
*Serratia marcescens* ATCC 181
*Sarcina lutea* ATCC 9341
*Micrococcus roseus* ATCC 416
*Cellulomonas rossica* ATCC 9717
*Micrococcus candidans* ATCC 8456
*Micrococcus roseus* ATCC 516

*Micrococcus lysodeikticus* ATCC 4698
*Corynebacterium fascians* Burkholder, No. 19
*Corynibacterium tumescens* ATCC 6947
*Flavobacterium suaveolens* ATCC 13533
*Pseudomonas cichorii* NRRL B832
*Pseudomonas solaniolens* NRRL B989
*Pseudomonas syringae* NRRL B32
*Pseudomonas viridiflava* NRRL B893
*Pseudomonas striata* NRRL B2022
*Pseudomonas angulata* NRRL B824

*Example X*

The procedure of Example VI was followed but using *Micromonospora fusca* ATCC 13634 as the hydrolyzing enzyme and a sterile aqueous medium of the following composition:

| Ingredient: | Grams/liter |
|---|---|
| Yeast extract | 4.0 |
| Malt extract | 10.0 |
| Cerelose | 4.0 |

Adjust to pH 7.3 with dilute potassium hydroxide.
Tap water to volume.

*Example XI*

The procedure of Example X was repeated but using the following medium:

| Ingredient: | Grams/liter |
|---|---|
| NZ amine B | 10.0 |
| Cerelose | 10.0 |
| Yeast extract | 1.0 |
| Calcium carbonate | 1.0 |

Adjust to pH 6.7 with dilute potassium hydroxide.
Tap water to volume.

Substitution of *Nocardia sp.*, strain L.A.V. ATCC 13635 for *Micromonospora fusca* ATCC 13634 also produces 6-aminopenicillanic acid.

*Example XII*

Freeze dried cells of *Proteus rettgeri* ATCC 9919 grown in the medium of Example VI, were resuspended in a volume of water equal to that of the original medium. Benzylpenicillin potassium salt (5 g./l.) and 1% by volume of toluene were added and the mixture shaken and incubated at 28° C. at pH 7.0 to 8.0, until the periodic assays showed good conversion to 6-aminopenicillanic acid. The broth was then filtered and worked up as in Example VI.

In like manner, freeze dried cells of *Micromonospora fusca*, ATCC 13634 and *Nocardia sp.*, strain L.A.V. ATCC 13635 shown in the medium of Example X produce 6-aminopenicillanic acid.

It is apparent from the examples given that many penicillins and many strains of microorganisms may be used in the process of this invention. Moreover, many of the new penicillins constantly being developed will be found operative as substrates in this process. A comprehensive listing of penicillins or a cataloging of useful strains of microorganisms is not possible. The genera of microorganisms exemplified are widely distributed and other genera, for example, the strains of microorganisms of other genera cited in "Bergey's Manual of Determinative Bacteriology," 7th Edition, pages xiii to xviii will be found operative in the process of this invention.

What is claimed is:

1. In a process for the production of 6-aminopenicillanic acid by contacting a penicillin with penicillin-acylase, the improvement which comprises employing penicillin-acylase produced by a strain of microorganism selected from the group consisting of *Pseudomonas phaseolicola, Pseudomonas asplenii, Pseudomonas aureofaciens, Pseudomonas chlororaphis, Pseudomonas aeruginosa, Pseudomonas cichorii, Pseudomonas solaniolens, Pseudomonas syringae, Pseudomonas viridiflava, Pseudomonas striata, Pseudomonas angulata, Xanthomonas uredovorus, Alcaligenes faecalis, Erwinia amylovora, Proteus rettgeri, Proteus sphingidis, Serratia morcescens, Bordetella pertussis, Corynebacterium fascians, Corynebacterium tumescens, Flavobacterium suaveolens, Micrococcus lysodeikticus, Micrococcus candidans, Micrococcus roseus, Cellulomonas rossica, Micromonospora fusca,* and *Nocardia sp.,* strain L.A.V.

2. The process of claim 1 wherein the 6-aminopenicillanic acid is recovered.

3. A process according to claim 1 wherein an aqueous penicillin-containing nutrient medium is fermented under submerged aerobic conditions.

4. The process of claim 1 wherein the mycelium is first separated from the broth and the pencillin is then contacted with an aqueous suspension of the mycelium.

5. The process of claim 1 wherein the penicillin is selected from the group consisting of the sodium and potassium salts of benzylpenicillin, phenoxymethylpenicillin, allylmercaptomethylpenicillin, phenylthiomethylpenicillin, p-hydroxybenzylpenicillin, p-nitrobenzylpenicillin, and p-methoxybenzylpenicillin.

6. The process of claim 1 wherein the penicillin is contacted with a growing culture of a penicillin acylase producing strain of microorganism.

7. A process for the preparation of an aqueous solution of 6-aminopenicillanic acid which comprises bringing together benzylpenicillin and bacterial cells of *Alcaligenes faecalis* in aqueous medium and recovering 6-aminopenicillanic acid from said aqueous medium.

References Cited by the Examiner

Herrell, Penicillin and Other Antibiotic Agents, p. 28, 1946, published by W. B. Saunders Co., Philadelphia and London.

J. Ag. Chem. Soc., Japan, 23, p. 411 (1950).

A. LOUIS MONACELL, *Primary Examiner.*

TOBIAS E. LEVOW, ABRAHAM H. WINKELSTEIN,
*Examiners.*

D. M. STEPHENS, *Assistant Examiner.*